Figure 1:
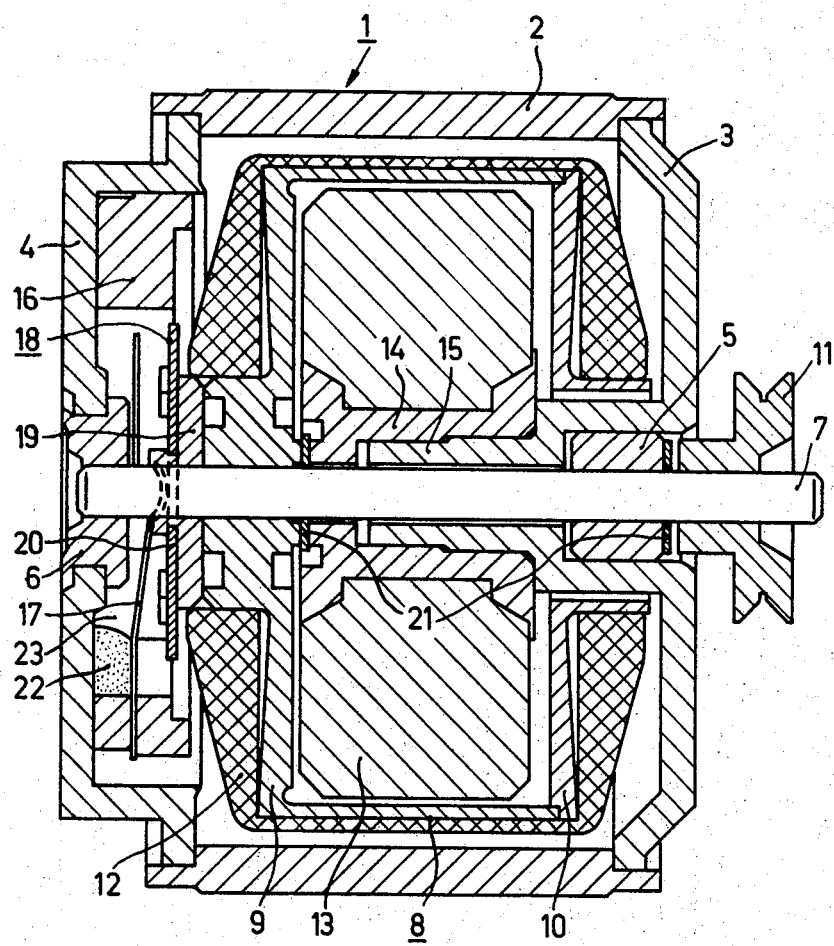

United States Patent [19]
van de Griend

[11] 3,824,416
[45] July 16, 1974

[54] VIBRATION-DAMPED BRUSH ASSEMBLY FOR USE IN A SMALL DYNAMO-ELECTRIC MACHINE

[75] Inventor: Jan Maarten van de Griend, Dordrecht, Netherlands

[73] Assignee: U.S. Philips Corporation, New York, N.Y.

[22] Filed: Sept. 20, 1972

[21] Appl. No.: 290,473

[30] Foreign Application Priority Data
Sept. 30, 1971 Netherlands ...................... 7113387

[52] U.S. Cl. .................................. 310/51, 310/242
[51] Int. Cl. ............................................. H02k 5/24
[58] Field of Search ....... 310/51, 242, 67, 171, 248, 310/42, 237, 43, 239, 45, 154; 260/DIG. 4

[56] References Cited
UNITED STATES PATENTS

| | | | |
|---|---|---|---|
| 1,835,788 | 12/1931 | Knoop | 310/242 |
| 2,847,593 | 8/1958 | Selbach | 310/51 |
| 2,944,169 | 7/1960 | Schmidt | 310/239 |
| 3,399,103 | 8/1968 | Salyer | 260/DIG. 42 |
| 3,430,084 | 2/1969 | Hall | 310/242 |
| 3,475,632 | 10/1969 | Moresi | 310/67 |
| 3,514,654 | 5/1970 | Moresi | 310/237 |
| 3,527,969 | 9/1970 | Papst | 310/51 |
| 3,554,855 | 1/1971 | Oberst | 260/DIG. 42 |

FOREIGN PATENTS OR APPLICATIONS
741,538   5/1943   Germany ........................... 310/242

*Primary Examiner*—R. Skudy
*Attorney, Agent, or Firm*—Frank R. Trifari

[57] ABSTRACT

A small electric machine, such as a motor or a tachogenerator, which employs a commutator and a brush assembly, in which the undesirable vibrations of the brushes with respect to the commutator are damped by damping means. The preferred damping means comprises amounts of a plastic deformable putty-like damping material, for example on the basis of polyvinylacetate. This material is provided at the locations of the brushes. The damping material adheres both to the brush and to the fixed parts of the machine. To reduce contact noise, plate-shaped brushes having leaf-spring-like brush elements preferably are formed with long parts which are in contact with the damping material. This may be effected with little loss of space by connecting the leaf springs to a brush support via parts which extend on both sides of the leaf springs parallel therewith.

4 Claims, 2 Drawing Figures

VIBRATION-DAMPED BRUSH ASSEMBLY FOR USE IN A SMALL DYNAMO-ELECTRIC MACHINE

The invention relates to a small electric machine provided with a brush assembly which comprises a plurality of brushes which each cooperate with a commutator or with slip rings, the respective contact surfaces of the brushes and the cooperating commutator or slip rings being resiliently urged together and damping means being provided for damping vibrations of the contact surfaces with respect to each other.

In high-quality small electric machines of the aforementioned type, for example direct-current tachogenerators or battery-fed direct-current commutator motors for use in portable tape recorders, a high quality of commutation is essential, since it affects various important factors, such as the useful life of the machine, the uniformity of the rotating movement of a motor when its speed is electronically controlled, the occurrence of electromagnetic interference at AM and FM frequencies and also the mechanically generated noise of the brushes moving over the commutator or slip rings. In tachogenerators the quality of commutation determines the amount of noise in the output signal.

Hence there is a tendency in the construction of machines of this type to design the brush assemblies and the commutator or slip rings cooperating therewith so that the contact pressures produced are small but at the same time the variations in contact pressure which occur in operation are a minimum. The latter requirement cannot readily be satisfied in practice in view of the vibration phenomena which occur in the brush assembly, for the brush assembly always is a mechanical mass-spring system which owing to the irregularities of the commutator or the slip rings is subjected to a force which varies in time.

Thus the desired high-quality commutation is determined not only by a construction such of the commutator or the slip rings as to give rise to only small time-variable forces, but also by the dynamic properties of the mechanical mass-spring system. It will be clear that good results are to be expected when using a mass-spring system which is not entirely undamped. Although all materials, and hence the metals of the springs used etc. also, have some damping properties, these usually are too small to obviate the need for special damping provisions.

British Pat. Specification No. 987.375 describes a brush assembly of the type mentioned at the beginning of the present application. This known brush assembly comprises an insulating plate which is detachably arranged outside an opening in a motor housing and bears two arms which extend into the housing and each carry a spring-loaded brush which cooperates with the commutator of the machine, each arm being loaded by a leaf spring one end of which bears on an outer side of an associated support which at one end is rigidly secured to the insulating plate and at the other end forms the fulcrum for the arm which is urged thereto by the leaf spring. In this brush assembly a certain degree of frictional damping occurs owing to the friction which is produced between the leaf springs and the supports each time an arm pivots about its fulcrum. It has been found, however, that the value of the friction produced between the leaf springs and the supports cannot readily be maintained constant in time. This is due to various phenomena which occur at the area of the contact surfaces between the springs and the supports, in particular a certain degree of wear and corrosion phenomena. In addition, such damping is not suitable for all brush assemblies, because the latter do not always include parts which rub on one another.

In another known brush assembly for a small direct-current commutator motor the brushes are secured to metal brush yokes which are mounted, with the interposition of rubber parts, on a brush support made of a synthetic material. However, the use of rubber involves certain disadvantages. The rubber has only a small internal damping, the surface of contact with the brush yokes is only small and the tolerances both of the dimensions and of the physical properties are comparatively large. Furthermore the rubber can absorb only compressive forces, unless it is rigidly secured to the brush yokes, for example by means of some glue, but this in turn creates new difficulties, because the glue gives rise to local hardening of the rubber and also to other problems.

It is an object of the present invention to provide a brush assembly of the type described at the beginning of this application in which excellent damping is obtainable with very simple means, and the invention is characterized in that the said damping means comprise a plastically deformable putty-like damping material which is interposed between parts of the brush assembly which are subject to vibrations and fixed parts of the machine and stickingly adheres to these parts.

The term "a putty-like damping material" is used herein to denote a substance which owing to its comparatively high plastic deformability in a sense has properties of a liquid, but also elastic properties. A damping material which has proved highly suitable for the intended purpose is a material on the bases of polyvinylacetate. Materials of this kind are frequently used in building for sealing joints and rifts between parts of a building or house and retains its plastic properties for a long time.

In an electric machine according to the invention in which a brush assembly of the known type is used which is provided with a plurality of integral brushes made of sheet material which each comprise a plurality of brush elements in the form of leaf springs which at their non-free ends are joined to a cross-part which via connecting leaf springs arranged on either side is connected to the brush support, an embodiment of the invention may advantageously be used which is characterized in that the connecting leaf springs arranged on either side of the said cross part are disposed adjacent to the brush elements are substantially parallel therewith in a direction from the cross part to the free ends of the brush elements, the damping material making a sticking contact with the ends of the brush elements remote from the free ends, with the said cross part and with the connecting leaf springs.

Figure 2:
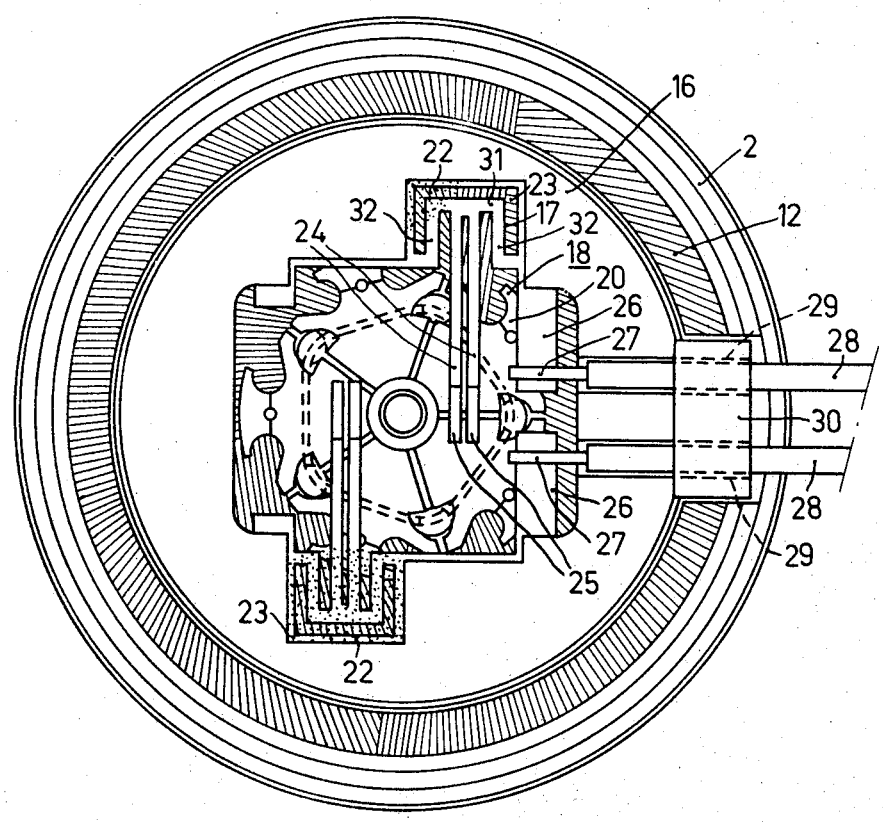

An embodiment of the invention will now be described, by way of example, with reference to the accompanying diagrammatic drawings, in which:

FIG. 1 is a longitudinal sectional view, at about seven times natural size, of a direct-current commutator motor for use in a battery-fed tape-recorder, which motor is provided with a flat commutator which cooperates with a brush assembly according to the invention which comprises a plurality of leaf springs, and FIG. 2 is an elevation of that axial end of the motor of FIG. 1 which is adjacent the brush assembly, with the respective end shield removed and with the damping material partly removed at the location of one of the brushes.

Referring now to FIG. 1, a motor 1 has a tubular metal housing 2 and metal end shields 3 and 4 which are mounted each at one end of the housing and carry sliding bearings 5 and 6 respectively made of sintered bronze. To a shaft 7 of the motor there are secured a coil support 8, which comprises a coil former 9 and a coil former cover 10, and a pulley 11 which serves to drive the reel of a small portable tape-recorder via a belt, not shown. The coil support 8 carries a bobbin-shaped coil 12, i.e., a coil the turns of which are evenly distributed over the cylindrical surface, whilst the wires which extend on the cylindrical surface are substantially parallel to the shaft 7 and at the axial ends of the coil cross the latter substantially diametrically to the respective other end. The coil support 8 surrounds an annular diametrically magnetized permanent magnet 13 having a core 14 made by injection moulding of a thermoplastic synthetic material. The core 14 is mounted on a tubular projecting part 15 of the end shield 3 which concentrically surrounds the shaft 7. A brush support 16 is secured in the end shield 4 and carries brushes 17 which cooperate with a commutator 18 mounted on the shaft 7. This commutator is a flat commutator which comprises a support 19 which is made of a synthetic material and carries a plurality of metal commutator segments 20. Between the coil former 9 and the core 14 of the permanent magnet 13 and between the bearing 5 and the pulley 11 rings 21 made of nylon are interposed to absorb any axial loads which may act on the shaft 7.

The damping means provided in the motor 1 for damping vibrations of the contact surfaces of the brushes 17 relative to the commutator 18 comprise an amount of a plastically deformable putty-like damping material 22 which is provided at each brush 17 in a recess 23 formed in the brush support 16. The damping material is in sticking contact with fixed components of the motor 1, such as the brush support 16 and the end shield 4, and also with the brushes 17 which are subject to vibrations.

Each of the brushes 17, see FIG. 2, comprises two brush elements in the form of metal leaf springs 24. Free ends 25 of the leaf springs 24, which ends are bent after the fashion of spoons, cooperate with the commutator 18. The brushes are mounted in the brush support 16 so as to be insulated from each other and they are electrically connected via lugs 26 to copper cores 27 of two wires 28 which pass through openings 29 formed in a projection 30 of the brush support 16.

The brushes 17 shown in FIGS. 1 and 2 each have two brush elements which are in the form of leaf springs 24 which at their non-free ends 25 are connected to a cross part 31 which via connecting leaf springs 32 provided at both ends is connected to the brush support 16. The connecting leaf springs 32 are located by the sides of the leaf springs 24 so as to extend substantially parallel therewith in a direction from the cross part 31 to the free ends 25 of the brush elements 24. The damping material 22 makes a sticking contact with the ends of the leaf springs 24 remote from their free ends 25, with the cross part 31 and with the connecting leaf springs 32.

The shape of the brushes 17 shown in FIG. 2 is intended to reduce inconvenient contact noise, i.e., noise generated by the ends 25 of the springs 24 moving over the commutator 18. The vibrations produced thereby in the leaf springs 24 are ultimately transmitted via the brush support 16 to the end shield 4 and the remaining fixed components of the machine and, as the case may be, to parts of the tape-recorder incorporating the motor 1. The shape shown has the advantage that without undue increase of the dimensions of the brush 17 the said vibrations are compelled to travel a comparatively long path via the parts 31 and 32, which are stickingly connected to the damping material 23, before reaching the brush support 16. In the course of this path the intensity of the vibrations is greatly reduced by the damping material, resulting in a considerable overall reduction of the intensity of the contact noise.

The plastic and at the same time elastic properties of the putty-like damping material 22 impart a peculiar character to the brush assembly shown in the Figures, whilst the effective length of the resilient brush elements 24 is to be regarded in relation to the question whether the static properties or the dynamic properties of the brush assembly are considered.

The damping material does not affect the static contact pressure between the contact surfaces of the leaf springs 24 and the commutator 18; the significant factors are the dimensions and the material of the brushes 17, the initial bending imparted to the leaf springs before the brush assembly is mounted in the motor, and the axial position which the brush assembly occupies with respect to the commutator when mounted in the motor.

When assembling the motor the provision of the damping substance 22 in the appropriate spaces in the brush support 16 initially gives rise to a certain degree of bending of the highly fragile leaf springs 24, which also influences the static contact pressure between the springs 24 and the commutator 18. However, subsequently this influence is steadily reduced, because the damping substance is plastically deformed and hence effectively flows away, until it no longer exerts any static forces on the brushes 17. When considering the dynamic behaviour of the brushes, however, the presence of the damping material is found to have considerable influence. It not only provides truly viscous damping because it behaves as a highly viscous liquid, but it also has appreciable elastic properties. Thus, with respect to the variations in contact pressure which in operation are produced between the leaf springs 24 and the commutator 18 not only the free undamped length of each leaf spring, i.e., the distance between a free end 25 and the point at which the respective leaf spring first makes sticking contact with the damping material 22, is significant, but so are the dimensions of the remainder of the brush also. This provides the possibility of influencing the dynamic properties of the brushes independently of the static properties.

In tests carried out under realistic conditions on motors of the type shown in the drawings a commutation of hitherto unknown quality was obtained. In these tests the vibrations of the ends 25 relative to an imaginary reference plane parallel to the surface of the commutator 18 were measured. It was found that the use of the damping material reduced the average amplitude of the vibrations by a factor of the order of ten in comparison with that found with the provision of rubber.

It has been found that during manufacture the damping material may be provided with the simplest means and substantially without giving rise to problems.

Large variations in the properties of the damping material are obtainable by varying its composition.

In addition, the manufactures of such materials may readily take into account requirements with respect to properties which are important with a view to workability and usability, such as adherence to metals and other materials, constancy of the viscosity as a function of time and of temperature, toxicity, and so on.

For the intended purpose a damping material was developed on the basis of polyvinylacetate and a polymerous softener with additions of titanium dioxide, calcium carbonate and carbon black.

What is claimed is:

1. An electric machine provided with a brush assembly which comprises a plurality of brushes which each cooperate with a commutator, in which the respective contact surfaces of the brushes and the cooperating commutator are resiliently urged toward one another, means also being provided for damping vibrations of the contact surfaces with respect to each other, said damping means comprising a plastically deformable putty-like damping material which is interposed between component parts of the brush construction which are subject to vibrations and fixed parts of the machine and which stickingly adheres to these parts.

2. An electric machine provided with a brush assembly which comprises a plurality of brushes which each cooperate with slip rings in which the respective contact surfaces of the brushes and the cooperating slip rings are resiliently urged toward one another, means also being provided for damping vibrations of the contact surfaces with respect to each other, said damping means comprising a plastically deformable putty-like damping material which is interposed between component parts of the brush construction which are subject to vibrations and fixed parts of the machine and which stickingly adheres to these parts.

3. The machine of claim 1 including a damping material consisting essentially of a polyvinylacetate.

4. An electric machine comprising a brush assembly which is provided with a plurality of integral brushes made of sheet material which brushes cooperate with a commutator, respective contact surfaces of the brushes and cooperating commutator being resiliently urged toward one another, each of said brushes comprising a plurality of brush elements in the form of leaf springs, said springs at the ends remote from their free ends being connected to a cross part, said cross part having connecting leaf springs arranged on either side for connecting the cross part to the brush support, the connecting leaf springs being located adjacent the brush elements and extending substantially parallel therewith in a direction from the cross part to the free ends of the brush elements and means also being provided for damping vibrations of the contact surfaces of the brush and commutator with respect to each other, said damping means comprising a plastically deformable putty - like damping material which is interposed between component parts of the brush construction which are subject to vibrations and fixed parts of the machine, the damping material making sticking contact with the ends of the brush elements remote from their free ends, with the cross part and with the connecting leaf springs.

* * * * *